United States Patent
Mann et al.

(10) Patent No.: US 7,890,804 B2
(45) Date of Patent: Feb. 15, 2011

(54) PROGRAM MEMORY TEST ACCESS COLLAR

(75) Inventors: Gregory J. Mann, Colorado Springs, CO (US); Robert S. Hoffman, Colorado Springs, CO (US)

(73) Assignee: Cypress Semiconductor Corporation, San Jose, CA (US)

( * ) Notice: Subject to any disclaimer, the term of this patent is extended or adjusted under 35 U.S.C. 154(b) by 410 days.

(21) Appl. No.: 11/906,153

(22) Filed: Sep. 28, 2007

(65) Prior Publication Data
US 2009/0089472 A1    Apr. 2, 2009

(51) Int. Cl.
*G06F 11/00* (2006.01)
(52) U.S. Cl. .......................... 714/30; 714/762; 714/788
(58) Field of Classification Search .................. None
See application file for complete search history.

(56) References Cited

U.S. PATENT DOCUMENTS

| | | | |
|---|---|---|---|
| 6,044,481 A * | 3/2000 | Kornachuk et al. | 714/724 |
| 6,249,893 B1 * | 6/2001 | Rajsuman et al. | 714/741 |
| 6,563,751 B1 * | 5/2003 | Wu | 365/201 |
| 7,363,440 B1 * | 4/2008 | Neuman | 711/154 |
| 2007/0180328 A1 * | 8/2007 | Cornwell et al. | 714/42 |
| 2009/0133003 A1 * | 5/2009 | Andreev et al. | 717/139 |

* cited by examiner

*Primary Examiner*—Christopher S McCarthy

(57) ABSTRACT

A memory access device includes logic to switch data from a processor memory bus to a memory bus in a first operational mode, and to switch data from a test bus to the memory bus in a second operational mode, and logic to switch address signals from the processor memory bus to the memory bus in the first operational mode. In the second operational mode the device accepts from the test bus a starting memory address for memory reads and writes, and automatically and independently of the test bus adjusts a memory address for reads and writes during burst memory operations.

19 Claims, 5 Drawing Sheets

PROGRAM MEMORY TEST ACCESS COLLAR

TECHNICAL FIELD

The present disclosure relates to memory test devices and procedures.

BACKGROUND

Embedded control and processing applications typically involve at least one processor and at least one memory to hold instructions and data to determine operation of the processor. The processor typically accesses the memory to obtain instructions and data to apply to those instructions, or to output data representing results of executing the instructions.

In prior art systems, the embedded program memory may be accessed for test purposes and/or to write the firmware and to configure the system. This access in prior systems may be accomplished only via the processor, in other words, by involving the processor to read and write memory locations.

For example, some prior methods of initializing and testing the memory involve writing address and data to registers which are polled by the processor. The processor is then instructed to read or write the data to/from the program memory as commanded.

Using the processor to access program memory is slow and somewhat complicated in operation. It also requires that the processor is operational in order to access the program memory, which may not always be convenient especially during development, test, and manufacture.

BRIEF DESCRIPTION OF THE DRAWINGS

In the drawings, the same reference numbers and acronyms identify elements or acts with the same or similar functionality for ease of understanding and convenience. To easily identify the discussion of any particular element or act, the most significant digit or digits in a reference number refer to the figure number in which that element is first introduced.

DETAILED DESCRIPTION

References to "one embodiment" or "an embodiment" do not necessarily refer to the same embodiment, although they may.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list.

"Logic" refers to signals and/or information that may be applied to influence the operation of a device. Software, hardware, and firmware are examples of logic. Hardware logic may be embodied in circuits. In general, logic may comprise combinations of software, hardware, and/or firmware.

Those skilled in the art will appreciate that logic may be distributed throughout one or more devices, and/or may be comprised of combinations of instructions in memory, processing capability, circuits, and so on. Therefore, in the interest of clarity and correctness logic may not always be distinctly illustrated in drawings of devices and systems, although it is inherently present therein.

Memory Access and Test System

Figure 1:
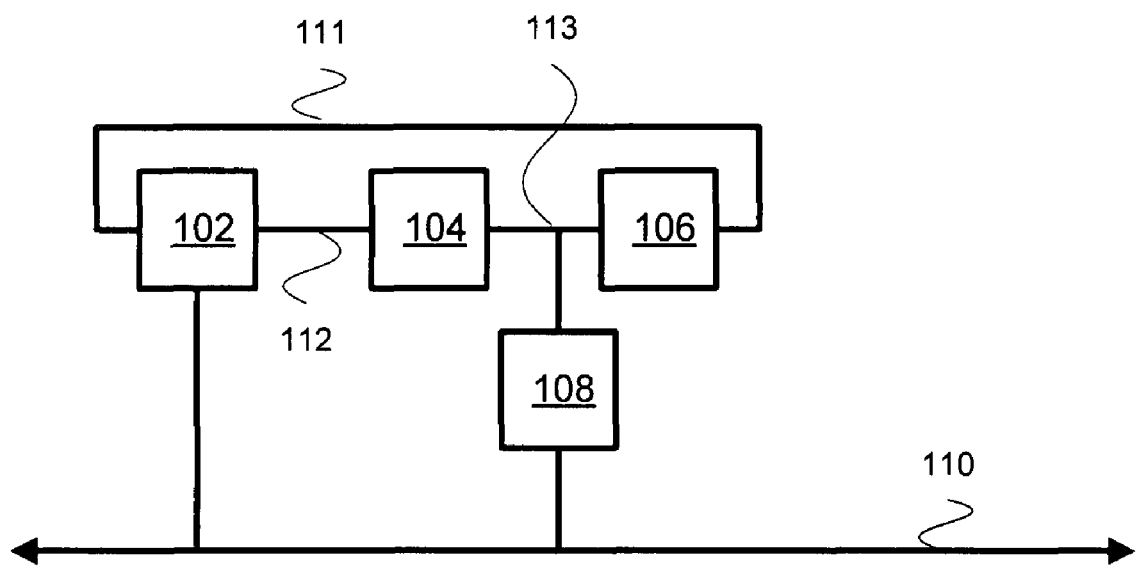
FIG. 1 is a block diagram of an embodiment of a system to access and/or test a memory without involving the processor.

FIG. 1 is a block diagram of an embodiment of a system to access and/or test a memory without involving the processor.

In normal operation, the processor may access the memory without significant performance penalty incurred by the presence of the logic to bypass the processor when accessing the memory.

The system includes, but may not be limited to, a processor 106, a test collar 102, a memory 104, and a test collar output 108. Other elements and/or couplings among the elements have been omitted as they would be apparent to skilled practitioners in the relevant art(s).

Various data paths in the system include a processor memory bus 111 and a memory data output bus 113 (which may be operated in conjunction with the processor memory bus 111 but is illustrated separately for clarity). A bus 112 between the test collar 102 and the memory 104 is signal-compatible with the processor memory bus 111, and may in some embodiments essentially duplicate (e.g. pass through) the signaling of the processor memory bus 111.

The system includes a test bus 110 to access memory 104 via the test collar components 102, 108 without involving the processor 106. The test bus 110 may for this purpose convey control and data signals to the memory test collar 104 and test collar output 108. The test bus 110 may be implemented in various ways, including for example as a tri-stated bus or as two parallel busses (read and write).

The processor 106 executes instructions to perform data processing and control operations. The processor may comprise, for example, one or more embedded processors, digital signal processors, and general purpose processors. The test collar 102 is a logic block that provides transparent access by the processor 106 to the memory 104 during normal operation, and fast access to memory 104 without using the processor 106 in other circumstances (test, memory initialization, etc.). The memory 104 provides storage of program instructions and data to enable data processing by the processor 106. Examples of memory 104 include a non-volatile memory technology such as non-volatile SRAM (Synchronous Dynamic Random Access Memory) or flash (e.g. NAND flash); the memory 104 also include volatile memory technologies such as single data rate RAM (SDRAM), double data rate RAM (DDRAM), DDR2, asynchronous SRAM, C-F card, or PCI-Express (among other examples); the memory 104 may also comprise hybrid combinations of non-volatile and volatile memory technologies. The test collar output 108 is a logic block that provides capture of memory 106 outputs to the test bus 110 without using processor 102. Other examples and/or embodiments of a processor 102, a test collar 104, a memory 106, and a test collar output 108 may be apparent to skilled practitioners in the relevant art(s).

Figure 2:
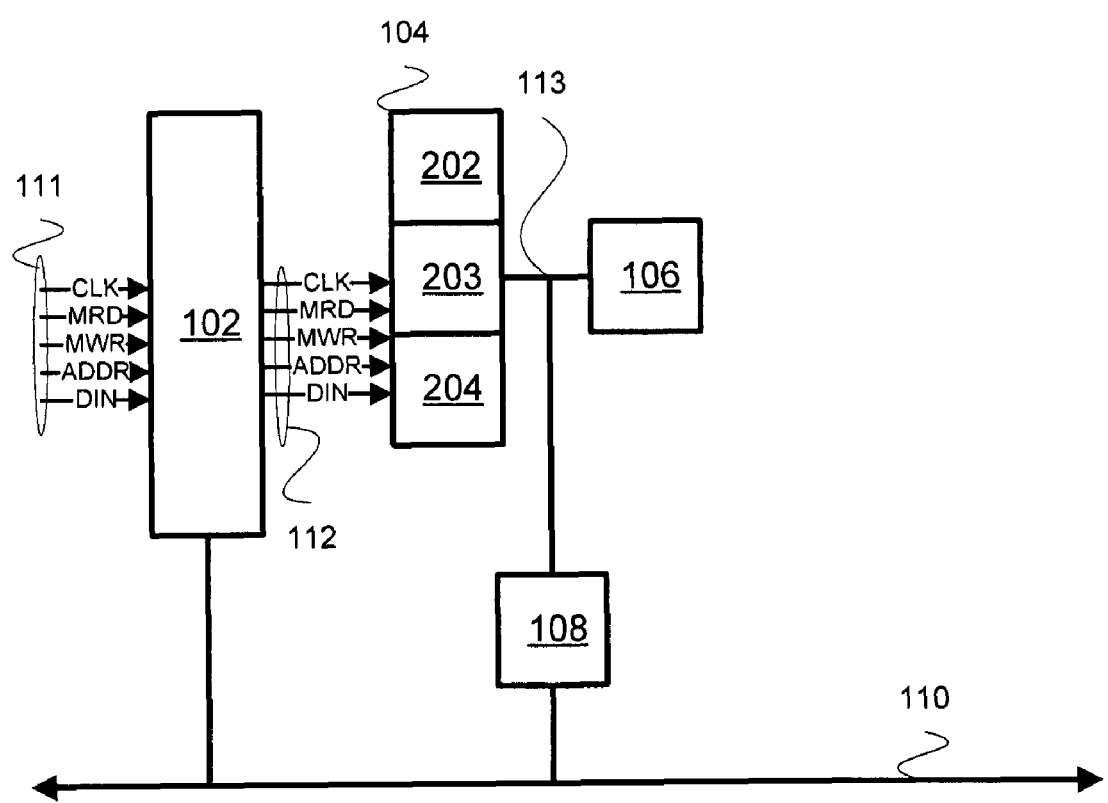
FIG. 2 is a block diagram showing the FIG. 1 memory access system embodiment in more detail.

FIG. 2 is a block diagram showing the FIG. 1 memory access system embodiment in more detail. The processor memory bus 111 and bus 112 between the test collar 102 and memory 104 may comprise a bus clock signal path CLK to provide synchronous operation of the collar 102, memory 104, and busses 111/112. Memory read MRD and memory write MWR signal paths may also be included on the bus. The busses 111/112 may include address paths ADDR to provide a memory address target for memory read and write operations. The busses 111/112 may also include a data input path DIN to carry data to write to the memory 104.

In the embodiment of FIG. 2, paths of the processor memory bus 111 are essentially duplicated by the test collar 102 to the bus 112 between the collar 102 and the memory 104. In normal operation (e.g. field operation), control, data, and address signals from the processor 106 may be "passed through" the test collar 102 to the memory 104 without substantial alteration, adjustment, or adaptation. Thus in normal operation the test collar 102 incurs very low overhead in terms of performance, processing, or power consumption.

In other embodiments, the test collar 102 may perform some adaptation, alteration, or adjustment of the processor memory bus signals (for example, adapting them to a different memory interface). In such circumstances the test collar 102 may emulate a particular memory interface to the processor 106 during normal operation.

In some embodiments, such as embedded applications, the memory 104 may be a non-volatile memory with various components including a program ROM (e.g. 4 k×8 bit program ROM) 202, a program nvSRAM 203, and a data nvSRAM 204. During test and/or factory initialization of the memory 104, program instructions and data may be written to the program ROM 202 and/or other components of the memory 104. The program nvSRAM 203 and data nvSRAM 204 may be utilized primarily during normal operation for dynamic instruction and data storage.

Figure 3:
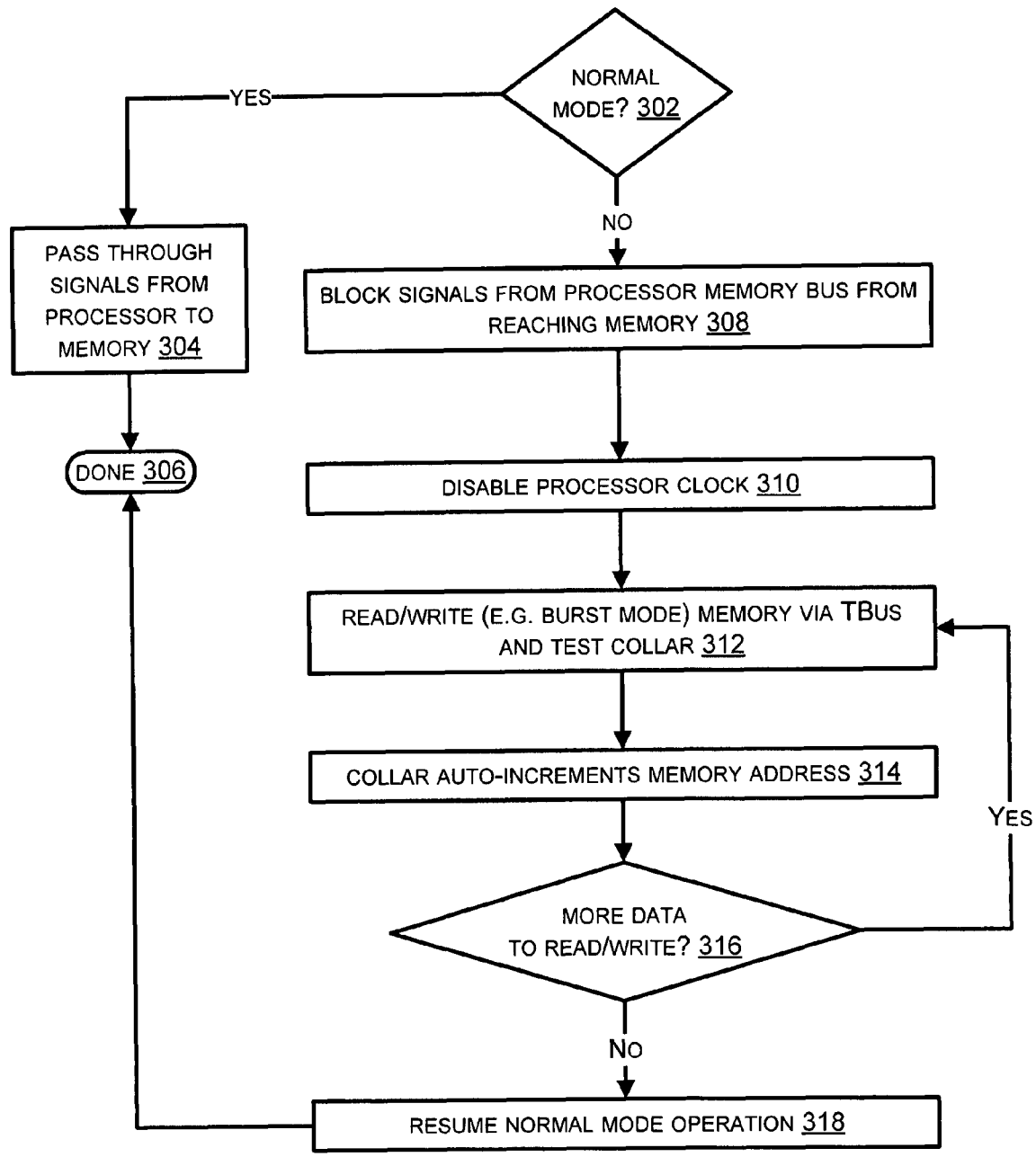
FIG. 3 is a flow chart of an embodiment of a process of accessing memory while bypassing the system processor, and using auto-address increment to speed memory access.

Memory Access with Auto-Increment FIG. 3 is a flow chart of an embodiment of a process of accessing memory while bypassing the system processor, and using auto-address increment to speed memory access. If normal mode is in effect (302), signals are passed through the test collar logic block from the processor to the memory (304). Otherwise, if the operating mode is not normal (e.g. it is a test or initialization mode), signals from the processor to the memory are blocked by the test collar logic (308). The processor clock is also disabled (310), essentially shutting down the processor and preventing corruption of processor registers. The memory may now be read and/or written via the TBus (312).

Reads are accomplished by presenting a read signal and address via the test collar logic, which presents these signals to the memory. The memory outputs data from the memory address to the test collar output logic block, which presents this data on the TBus.

Writes are accomplished by presenting a write signal and address and data via the test collar logic, which presents the signals and data to the memory. The memory stores the data in the specified address.

Reading and writing may be accomplished in burst mode. For example, when a block of sequential address locations of the memory 104 are to be written or read, only the starting address may be communicated to the test collar 102; from that point until the end of the operation, only the data needs to be transferred to or from the test collar 102 via the test bus 110. This reduces the amount of data that needs to be transferred via the busses 110/112, greatly speeding block read or write operations.

The test collar logic may automatically increment the memory address for reading/writing between read/write operations (314). After each write or read operation on the memory, the address may be automatically incremented in preparation for the next read or write operation. This may substantially decrease the time involved in a memory access operation, and may enable more thorough testing to be carried out in a limited time frame. For example, large numbers of test patterns may be read and written in a shorter time frame by utilizing the address auto-increment feature. If there's more data to read or write (316), processing continues (312), otherwise normal mode may be restored (318) and the process concludes (306).

Memory Test Collar Implementation

Figure 4:
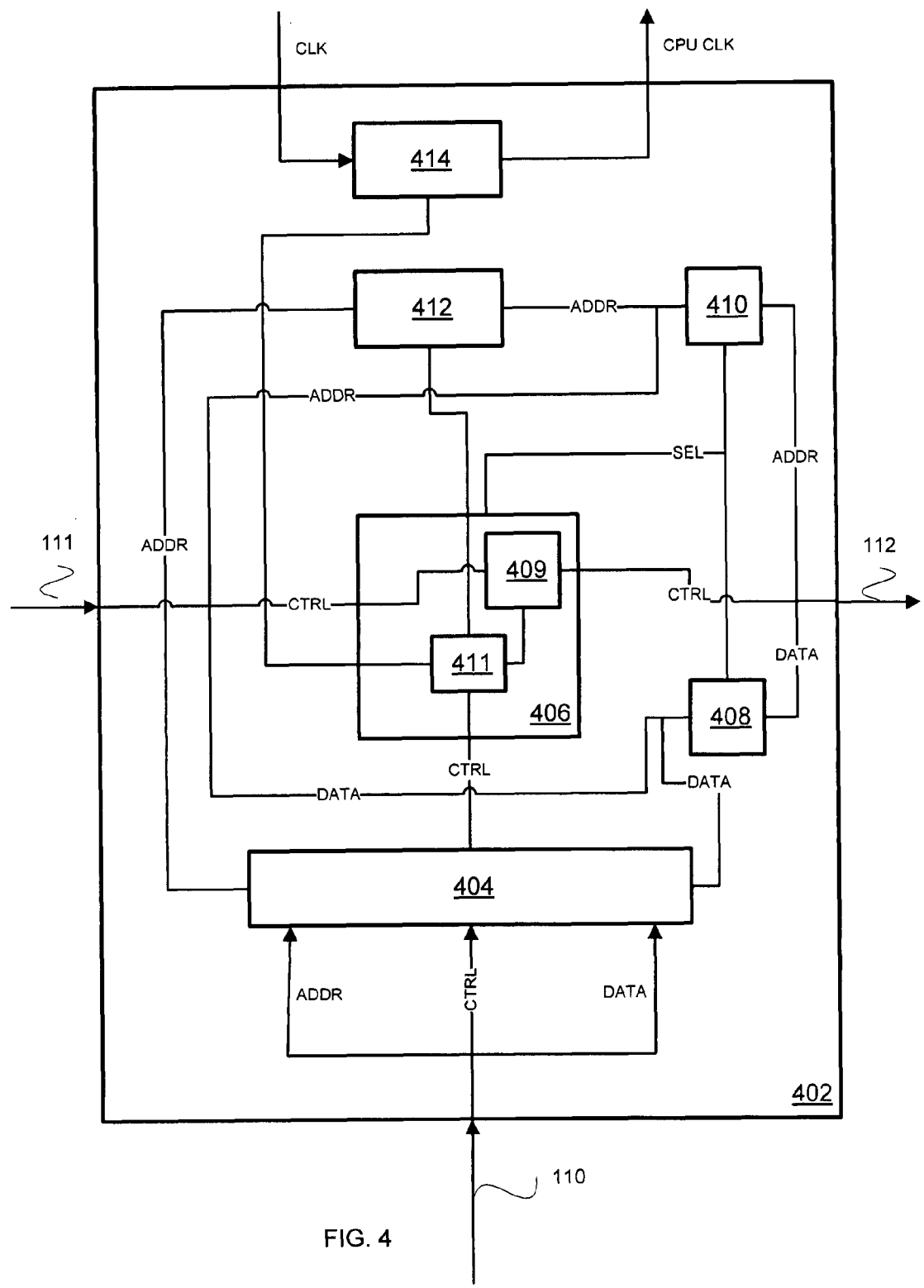
FIG. 4 is a block diagram of an embodiment of memory test collar logic.

FIG. 4 is a block diagram of an embodiment of memory test collar logic. The test collar 402 receives inputs from the processor memory bus 111 and the test bus 110, and selects the appropriate input to the memory bus 112.

The collar 402 may comprise a register bank 404 to latch address, data, and control signals from the test bus 110. Registers 404 may be addressable via the test bus 110. Control signals from the test bus 110 latched by registers 404 may result in control signals to the control logic block 406. This may result in the collar 402 entering "test mode", wherein the processor is disabled and reads and writes to the memory 104 are accomplished via the test bus 110.

Control signals from the test bus 110 may be latched by the registers 404. These control signals may then pass to control logic 411 within the control logic block 406. The control logic 411 may respond to these control signals from the test bus 110, as well as to signals indicating that a data byte has been read (e.g. from 504, see FIG. 5) signals indicating that a data byte has been written (e.g. signals to registers 404). The control logic 411 may generate control signals to the memory (via switch 409) as well as control signals to control address incrementing logic 412. The internal signals from control logic 411 to address incrementing logic 412 to auto-increment the memory access address from which data is read or written, substantially improving memory performance in test mode. The control logic 411 or other logic of controller 406 may provide signals to switch logic 414 to disable the processor clock when entering test mode.

The collar 402 may comprise various sets of switching logic, such as multiplexers, to selectively route signals to the memory bus 112. For example, the collar 402 may comprise multiplexers 408, 409, and 410 to route data, control, and address signals, respectively, from either the processor memory bus 111 or the test collar 102 internal logic to the memory bus 112.

The switch 408 selects data from either the test bus 110 or the processor memory bus 111. The switch 409 selects control signals from either the control logic 411 or the processor memory bus 111.

Address signals from the test bus 110 are routed to the address incrementing logic 412, and the address output from the address incrementing logic 412 is provided to a switch 410. The address signals from the processor memory bus 111 are provided directly to the switch 410. Thus, the switch 410 selects either the output of the address incrementing logic 412 or address signals from the processor memory bus 111.

During normal operation, the collar 402 introduces very little signaling delay between the processor memory bus 111 and the memory bus 112. Only the delay of the switches 408, 409, and 410 is introduced. The switches 408, 409, and 410 may be relatively simple multiplexers with low propagation delay. Switches may be implemented as shown as discrete logic blocks or may be implemented, for example, as a single multiplexer with multiple address bits, or as some other type of routing circuit.

The test collar 402 thus eliminates dependence on the processor for accessing the memory during test, initialization, or other circumstances when the processor may be unavailable or may introduce undesirable delays, and in fact may greatly increase memory performance in test mode by incrementing the memory address internally and thus reserving most of the test bus 110 capacity in test mode for communicating data to and from the memory 104.

The test collar logic may comprise other components not shown but which would be apparent to those skilled in the relevant art(s).

Figure 5:
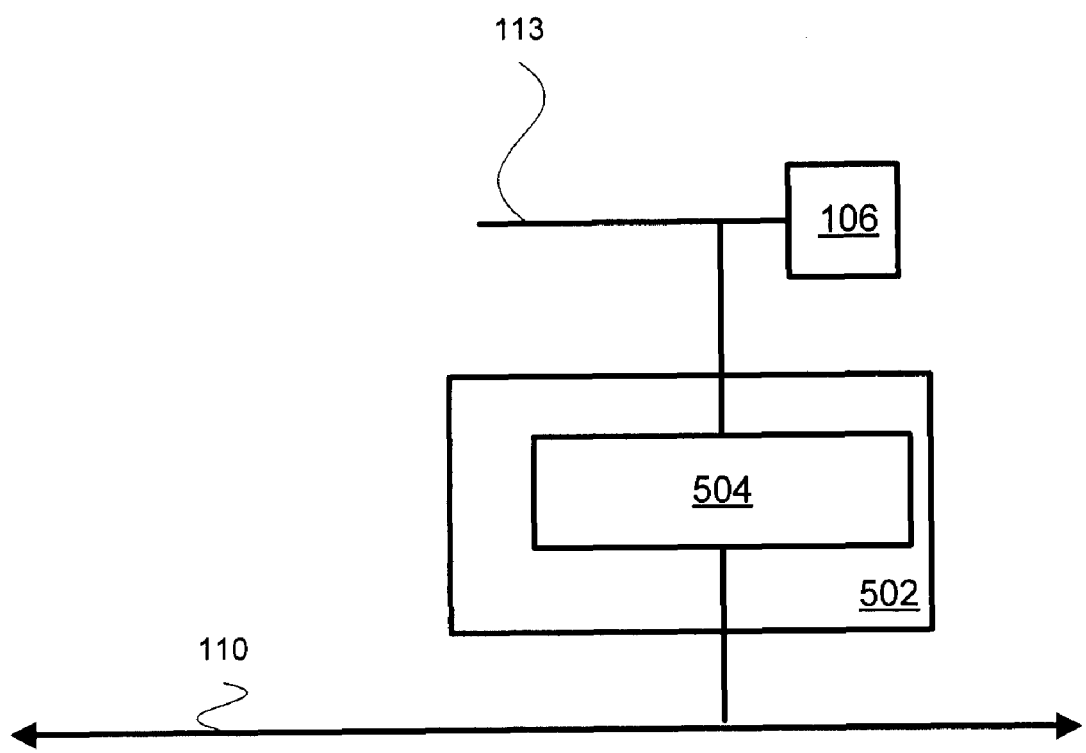
FIG. 5 is a block diagram of an embodiment of memory test collar output logic.

FIG. 5 is a block diagram of an embodiment of memory test collar output logic. The output logic 502 comprises registers 504 or other mechanisms to latch data from the memory data output bus 113 and provide this data to the test bus 110. Again, the test collar output logic may comprise components not shown but which would be apparent to those skilled in the relevant art(s). The test collar logic 402 may (and typically will) comprise the output logic 502, although they are illustrated separately for purposes of clarity. In some embodiments, a 'system on a chip' may comprise the processor 106, test collar 104, memory 104, and test collar output 108 within a single die and/or within a single pin package.

A memory access device in accordance with the described features may provide switching of data from a processor memory bus to a memory bus in a first operational mode (e.g. "normal" system operation), and to switch data from a test bus to the memory bus in a second operational mode (e.g. a test and/or memory initialization mode). The memory access device may switch address signals from the processor memory bus to the memory bus in the first operational mode, and in the second operational mode may accept from the test bus a starting memory address for memory reads and writes, and adjust this address automatically and independently of the test bus during burst memory operations.

Improved memory performance during the second operational mode may be achieved by providing control signals independently from the test bus to drive burst mode memory reads and writes. Memory performance in the first operational mode may not be substantially impacted, due to low-latency switching of control signals from the processor memory bus to the memory bus in the first operational mode (e.g. using low-latency multiplexers).

To further the independent operation of the device during burst mode operations, the device may include logic to detect conclusion of memory reads and writes in the second operational mode, and to adjust the memory address for reads and writes, independently of control signals from the test bus when operating in this mode. Low latency multiplexers may be employed to switch the data, address, and control signals to the memory bus, and the first and second operational modes via the test bus using command signals.

Those having skill in the art will appreciate that there are various vehicles by which processes and/or systems described herein can be effected (e.g., hardware, software, and/or firmware), and that the preferred vehicle will vary with the context in which the processes are deployed. For example, if an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations may involve optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

The foregoing described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

What is claimed is:

1. A memory access device comprising:
   hardware logic and/or logic embodied in machine memory circuits to switch data from a processor memory bus to a memory bus in a first operational mode, and to switch data from a test bus to the memory bus in a second operational mode; and
   hardware logic and/or logic embodied in machine memory circuits to switch address signals from the processor memory bus to the memory bus in the first operational mode, and in the second operational mode to accept from the test bus a starting memory address for memory reads and writes, and in the second operational mode to automatically adjust a memory address for reads and writes during burst memory operations wherein the test bus is not used in the propagation of signals to adjust the memory address for reads and writes during burst memory operations.

2. The memory access device of claim 1, further comprising:
   logic to switch control signals from the processor memory bus to the memory bus in the first operational mode, and in the second operational mode to provide control signals independently from the test bus to drive burst mode memory reads and writes.

3. The memory access device of claim 2, wherein the logic to provide control signals independently from the test bus to drive burst mode memory reads and writes further comprises: logic to detect conclusion of memory reads and writes, and to adjust the memory address for reads and writes, independently of control signals from the test bus.

4. The memory access device of claim 1, further comprising: multiplexers to switch the data, address, and control signals to the memory bus.

5. The memory access device of claim 1, further comprising:
   logic to set the first and second operational modes via the test bus.

6. The memory access device of claim 1, further comprising:
   logic to disable a processor clock in the second operational mode and to enable the processor clock in the first operational mode.

7. A device, comprising:
   a processor comprising a processor memory bus;
   a test bus;
   a memory accessed via a memory bus; and a memory access device to selectively enable access to a memory bus from either the processor memory bus or a test bus, comprising:
      logic to switch data from the processor memory bus to the memory bus in a first operational mode, and to switch data from the test bus to the memory bus in a second operational mode; and
      logic to switch address signals from the processor memory bus to the memory bus in the first operational mode, and in the second operational mode to accept from the test bus a starting memory address for memory reads and writes, and in the second operational mode to automatically adjust a memory address for reads and writes during burst memory operations wherein the test bus is not used in the propagation of signals to adjust the memory address for reads and writes during burst memory operations.

8. The device of claim 7, the memory access device further comprising:
   logic to switch control signals from the processor memory bus to the memory bus in the first operational mode, and in the second operational mode to provide control signals independently from the test bus to drive burst mode memory reads and writes.

9. The device of claim 8, wherein the logic to provide control signals independently from the test bus to drive burst mode memory reads and writes further comprises:
   logic to detect conclusion of memory reads and writes, and to adjust the memory address for reads and writes, independently of control signals from the test bus.

10. The device of claim 7, the memory access device further comprising:
    multiplexers to switch the data, address, and control signals to the memory bus.

11. The device of claim 7, the memory access device further comprising:
    logic to set the first and second operational modes via the test bus.

12. The device of claim 7, the memory access device further comprising:
    logic to disable a processor clock in the second operational mode and to enable the processor clock in the first operational mode.

13. The device of claim 7, the memory comprising:
    a program ROM, a program nvSRAM, and a data nvSRAM.

14. A method of selectively providing access to a memory from both a processor memory bus and a test bus, comprising:
    switching data from the processor memory bus to a memory bus in a first operational mode, and switching data from the test bus to the memory bus in a second operational mode; and
    switching address signals from the processor memory bus to the memory bus in the first operational mode, and, in the second operational mode, 1) accepting from the test bus a starting memory address for memory reads and writes, and 2) automatically adjusting a memory address for reads and writes during burst memory operations wherein the test bus is not used in the propagation of signals to adjust the memory address for reads and writes during burst memory operations.

15. The process of claim 14, further comprising:
switching control signals from the processor memory bus to the memory bus in the first operational mode, and in the second operational mode providing control signals independently from the test bus to drive burst mode memory reads and writes.

16. The process of claim 15, wherein providing control signals independently from the test bus to drive burst mode memory reads and writes further comprises:
detecting conclusion of memory reads and writes, and adjusting the memory address for reads and writes, independently of control signals from the test bus.

17. The process of claim 14, further comprising:
switching the data, address, and control signals to the memory bus using multiplexers.

18. The process of claim 14, further comprising:
setting the first and second operational modes via the test bus.

19. The process of claim 14, further comprising:
disabling a processor clock in the second operational mode and enabling the processor clock in the first operational mode.

* * * * *